Figure 1:
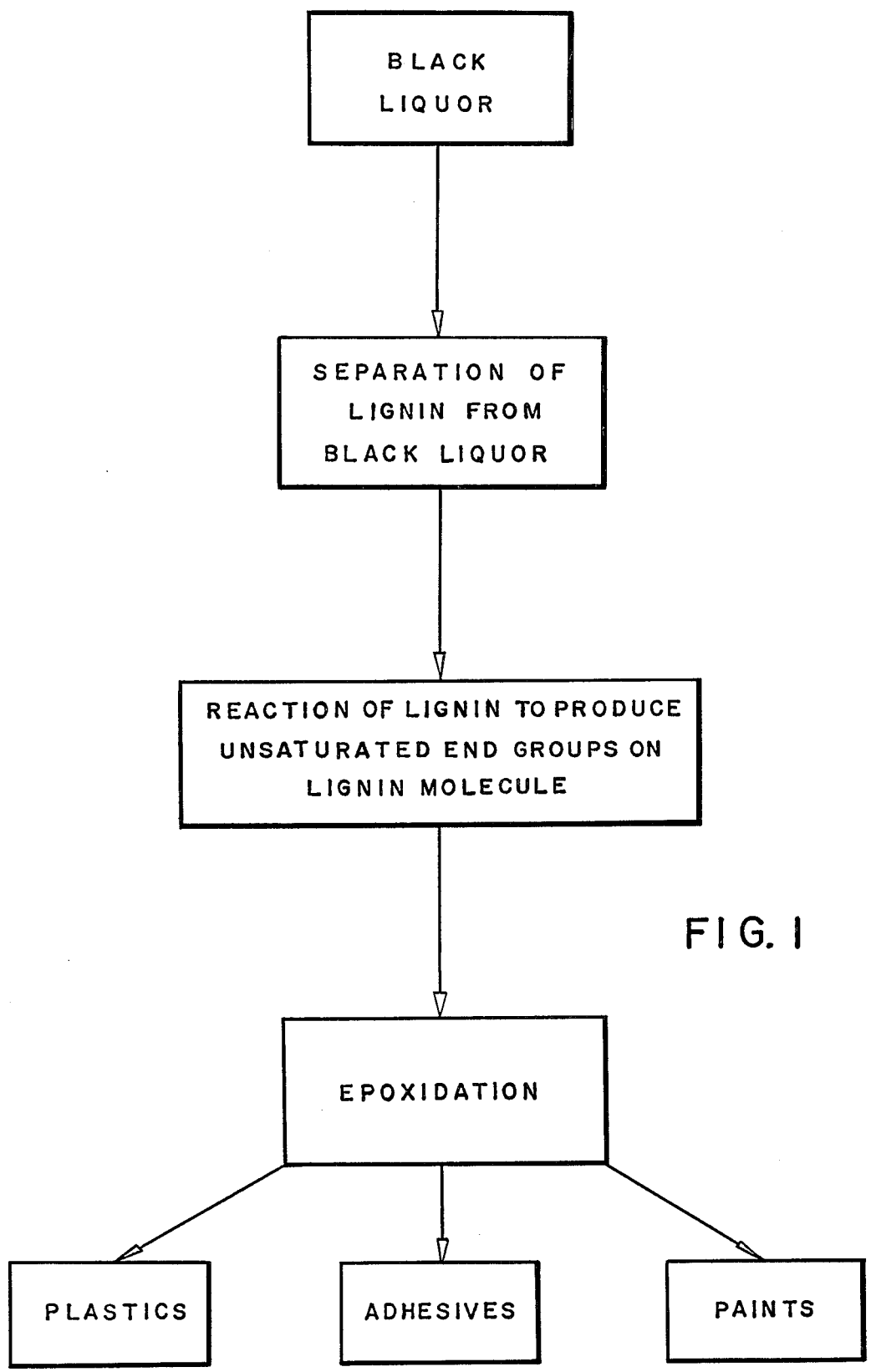

United States Patent [19]

Holsopple et al.

[11] 4,111,928

[45] Sep. 5, 1978

[54] METHOD OF SEPARATING LIGNIN AND MAKING EPOXIDE-LIGNIN

[76] Inventors: Dale B. Holsopple, 23381 Aurora Rd., Bedford Heights; Wasyl W. Kurple, 110 W. Grace, Bedford, both of Ohio 44146; William M. Kurple, 8429 N. 27th Ave., Phoenix, Ariz. 85021; Kenneth R. Kurple, 60691 New Haven Rd., New Haven, Mich. 48048

[21] Appl. No.: 742,773

[22] Filed: Nov. 18, 1976

Related U.S. Application Data

[60] Continuation-in-part of Ser. No. 608,640, Aug. 28, 1975, abandoned, which is a division of Ser. No. 453,672, Mar. 22, 1974, abandoned, which is a continuation-in-part of Ser. No. 354,356, Apr. 25, 1973, abandoned.

[51] Int. Cl.$^2$ ................................................ C07G 1/00
[52] U.S. Cl. ................................................. 260/124 R
[58] Field of Search ........................ 260/124 A, 124 R

[56] References Cited

U.S. PATENT DOCUMENTS

| 3,546,200 | 12/1970 | Whalen et al. | 260/124 A |
| 3,825,526 | 7/1974 | Forss et al. | 260/124 R |

*Primary Examiner*—Delbert R. Phillips
*Attorney, Agent, or Firm*—Woodling, Krost, Granger and Rust

[57] ABSTRACT

A process for the extraction or separation of lignin from waste black cooking liquor resulting from the kraft and sulfite paper pulping process. After the lignin is separated, it is reacted with a chemical system to produce unsaturated end groups on the lignin molecule which are epoxidized to produce a lignin-epoxide resin.

19 Claims, 1 Drawing Figure

METHOD OF SEPARATING LIGNIN AND MAKING EPOXIDE-LIGNIN

This application is a continuation-in-part application of U.S. patent application Ser. No. 608,640 filed Aug. 28, 1975, and entitled "Method of Separating Lignin And Making Epoxide-Lignin Resins", now abandoned which was a division of Ser. No. 453,672 filed Mar. 22, 1974, now abandoned which was a continuation-in-part of Ser. No. 354,356 filed Apr. 25, 1973, now abandoned all having the same title.

This invention relates to the separation of lignin from waste block cooking liquor resulting from the kraft and sulfite paper pulping process and the preparation of useful organic materials from the ligning. The useful organic materials include plastics, adhesives and resins for use, for example, in paints.

The kraft pulping process broadly relates to the separation of wood into cellulose and ligning. Other materials are separated, for example sugars, hemicelluloses, tall oil, and other chemicals. The separation is effected essentially by cutting the wood into small portions and then cooking them under heat and pressure with certain pulping chemicals which include sodium hydroxide and sodium sulfide. This cooking renders the lignin, sugars and hemicellulose materials soluble and these form the major materials present in the waste black liquor. There are, of course, other chemicals present as well as dissolved pulping chemicals. Normal procedure in a kraft plant is to evaporate the black liquor to a given solids content which solids are then burned in a furnace to recover the inorganic pulping chemicals which are recycled to produce more pulp. The cellulose is insoluble in the black liquor and is separated therefrom and made into paper. The only value obtained from the lignin in this just mentioned procedure is the heat value derived in the furnace. The sulfite process is well known to those skilled in the art.

The present invention basically involves the separation or extraction of lignin from waste black pulping liquor. The lignin may be used for many purposes and one use is to chemically place reactive unsaturated carbonyl groups or unsaturated nitrogen-containing compounds on the lignin molecule in addition to the unsaturated groups already naturally existing on the lignin molecule and thereafter produce an epoxide-lignin resin by reaction with another chemical, for example hydrogen peroxide. The epoxide-lignin resin may be cured to a hard infusible plastic by means of heat and/or a catalyst, it may be reacted with various fatty acids to produce resins for paints and inks or it may be reacted with various amines to produce polyamines or polyamides for use as adhesives or plastics. The aqueous phase of the waste black liquor from which the lignin is separated may be recycled in the normal way to recover the pulping chemicals.

The present invention provides a new and inexpensive source of epoxide resins and the ultimate products therefrom, at a time when the national petroleum supply is being acutely diminished. The supply of lignin from the paper industry measures in the millions of tons annually and as mentioned above, the bulk of this lignin is used for its heat value which is acquired by burning. The lignin source is essentially renewed each year by the tree planting policies of the major paper companies. Some of the strongest adhesives and plastics with excellent mechanical properties are epoxy-type adhesives and epoxy-types plastics.

Even though there are on the order of 160 million pounds of epoxy resins being used annually in the United States, the largest volume markets have been virtually untouched because of the present high cost of these resins. The present invention will drastically reduce the cost of epoxy-type resins so they can economically compete for the yet untouched markets.

The lignin separation portion of the present invention is highly useful in and of itself since it provides an economical method for acquiring an excellent grade of lignin from both kraft and sulfite black liquor.

The present prior art teaches that lignin in kraft black liquor may be precipitated and then filtered. Because of the fine colloidal nature of precipitated lignin the filtration of lignin becomes a difficult procedure. Because of this procedure lignin is fused during processing and the lignin formed is a frit-like material. Unfortunately this frit-like lignin material is very difficult to dissolve in solvents and other organic media. These frit-like lignins can be reprocessed to make them more usable, but the extra processing makes the cost of the lignin too expensive for large market application.

The present invention enables lignin to be obtained from kraft black liquor in a fine powder or dissolved in an organic medium which then can be readily dissolved in various solvents and organic media. This solubility characteristic enables the lignin produced from the invention to be utilized in large market applications. One significant advantage of the invention is that polyols can be used as the solvent or organic medium for the separation of lignin from kraft black liquor or sulfite waste liquor. In this way lignin can be effectively utilized in many polyurethane applications, because by using the lignin in conjunction with the polyol, the cost of the polyurethane product is significantly reduced.

In this invention relating to the separation of lignin from black liquor there are three distinct aspects, one aspect is where the lignin is soluble in the solvent or organic chemical medium that is used in the separation. As the solubility of the lignin in the aqueous phase is reduced, the lignin has more affinity for the solvent phase than the aqueous phase and a separation results. In this situation the preferred procedure is to reduce the solubility of the lignin in the aqueous phase. The reduction of the solubility of the lignin in the aqueous phase may not be necessary if the lignin is significantly soluble in the solvent or organic chemical medium. The description of this technology is demonstrated in examples 1 through 25 of the specification.

In the second approach of the separation invention, the lignin has normally only partial solubility in the solvent or organic chemical medium. In this case, as the solubility of lignin in the aqueous phase is decreased, the lignin, because of its partial solubility in the solvent or organic chemical medium, has more affinity for the solvent phase than the aqueous phase and a separation results. The description of this technology is demonstrated in examples 68 through 74 of the specification.

In the third approach of the invention, the lignin is considered to have no solubility in the solvent or chemical medium. In this case, as the solubility of the lignin is decreased in the aqueous phase, the lignin becomes dispersed in the solvent or chemical medium. This dispersion of the lignin can be improved through mechanical means. The dispersion of the lignin is achieved even though the lignin is not soluble in the solvent or chemical medium, by the fact that the surface of the lignin particles is wetted by the solvent or chemical medium.

Once the lignin particle is wetted, the lignin particles are prevented from forming aggregates. Thus the lignin is suspended in the solvent or chemical medium. The wetting of the lignin particles is enhanced by such mechanical means as agitation and conventional dispersing equipment. These lignin particles are formed when the solubility of the lignin in the aqueous phase is decreased to the point where the lignin is no longer soluble and precipitates out. Another significant advantage of the invention is that of using fluorocarbons which are "Freon" type of materials for the separation of lignin from kraft black liquor and sulfite waste liquor. These fluorocarbons are low boiling point materials which means that significantly less energy is required to spray dry the lignin from these materials. Also these fluorocarbons are nonflammable which means that safety is also significantly improved. These materials are also relatively non-toxic which also improves safety. The fluorocarbons are also inert so they can easily be recovered after spray drying and used again. The description of this technology is demonstrated in examples 75 through 79 of the specification.

The lignin from sulfite waste liquor is presently obtained by spray drying the waste sulfite liquor. The final product contains lignin, and also wood sugars, hemicelluloses and water soluble inorganic salts. These water soluble materials severely limit the potential applications that lignin from sulfite waste find. This invention is also applicable to sulfite waste liquor and this technology is demonstrated in examples 80 through 85 of the specification.

Other objects and a fuller understanding of this invention may be had by referring to the following description and claims, taken in conjunction with the accompanying drawings, in which:

FIG. 1 is a flow sheet showing the various steps involved in the teachings of the present invention.

As seen in the flow sheet of FIG. 1 and as discussed above, the first procedure involved in the present invention is the separation or extraction of the lignin from the waste black liquor resulting from the kraft paper pulping process. The first twenty-five examples (numbered Examples 1 through 25) illustrate this separation by the use of ketones, esters, aldehydes and ethers. Solids content of the black illustrated is 20% and 50%; however, other solids content may be utilized. The examples also illustrate that the separation may take place in acid or basic media. The specific ketones demonstrated are mesityl oxide, cyclohexanone, isophorone, and methyl heptyl ketone; esters are 2, 2 butoxy ethoxy ethyl acetate, hexyl acetate, heptyl acetate, amyl acetate, isoamyl acetate and phenyl acetate; aldehydes are benzaldehyde, valeradehyde, butyraldehyde and furfural; and ethers may be butyl ether and 2, 2 butoxy ethoxy ethyl acetate in addition to being an ester, is also an ether.

EXAMPLE 1

This example illustrates the extraction of lignin from kraft black liquor into an organic solvent. The pH of the black liquor may be on the order of 12 or 13. PROCEDURE: Charge 4000 ml. (4 parts) kraft black liquor (50% solids) into a 5-gallon vessel with some means of agitation. Then add 1000 ml. of water (1 part) and stir. Then add 700 ml. (0.7 part) of mesityl oxide (solvent) and stir. While the mixture is being stirred, add 250 ml. (0.25 part) of 80% acetic acid slowly over 10 minutes and stir for another 10 minutes. The mixture starts to thicken and then thins out again. At this time add another 300 ml. (0.3 part) of 80% acetic acid until the mixture is acidic. The amount of acid required may vary because alkalinity of the kraft pulps may also vary. The mixture is stirred for 10 minutes and the agitation is then stopped. The mixture is then allowed to stand and at the end of four hours there is a lignin-solvent layer on top which produces 908 gms. of lignin.

EXAMPLE 2

This example illustrates the extraction of lignin from kraft black liquor into an organic solvent, and the use of an ion (magnesium sulfate) to reduce soap formation and thus improve the extraction.

PROCEDURE: Charge 4000 ml. (4 parts) of kraft black liquor (50% solids) into a 5-gallon vessel. Then add 1400 ml. (1.4 parts) of water and stir. Then add 1400 ml. (1.4 parts) of mesityl oxide and stir. Premix 40 gms. (0.04 part) of magnesium sulfate in 200 ml. (0.2 part) water under agitation over 10 minutes. Add 450 ml. (0.45 part) of 80% acetic acid slowly while agitating the mixture. This addition requires about 15 minutes. Stir for 10 minutes and stop the agitation and allow the mixture to stand. At the end of four hours there is a lignin-solvent layer formed which produces 950 gms. of lignin.

EXAMPLE 3

This example illustrates the extraction of lignin from kraft black liquor which contains 20% solids.

PROCEDURE: Charge 8000 ml. (8 parts) of kraft liquor into a 5-gallon vessel. Then add 2400 ml. (24 parts) of water and stir. Then add 5000 gms. (5 parts) of mesityl oxide and stir. Then add 600 ml. (0.6 part) of 80% acetic acid over a 15-minute interval while the mixture is under agitation. Then stir for another 15 minutes. The agitation is stopped and the mixture allowed to stand for the formation of a lignin-solvent layer. This layer produces 700 gms. of lignin.

EXAMPLE 4

This example illustrates the extraction of lignin from kraft black liquor which contains 20% solids.

PROCEDURE: Charge 4000 ml. (4 parts) black liquor (20% solids) into a 5-gallon vessel with some means of agitation. Then charge 2000 ml. (2 parts) of water and stir. Then add 1400 ml. (1.4 parts) of mesityl oxide and stir. Then slowly add 375 ml. (0.375 part) of 80% acetic acid over a 15-minute interval. The mixture is then stirred for an additional 15 minutes and allowed to stand with no agitation. A lignin-solvent layer starts to form and is complete within a few hours. This layer produces approximately 350 gms. of lignin.

EXAMPLE 5

The example illustrates the extraction of lignin from kraft black liquor which contains 20% solids with an organic solvent.

PROCEDURE: Charge 4000 ml. (4 parts) of kraft black liquor into a 5-gallon vessel provided with some means of agitation. Then add 1000 ml. (1 part) water and stir. To this mixture is then added 2000 ml. (2 parts) of mesityl oxide and stirred for 5 minutes. Then 350 ml. (0.35 part) of 80% acetic acid is added slowly over a 15-minute interval, until the mixture is acidic. The addition of acid is stopped if the mixture starts to foam due to the evolution of gases. The mixture is stirred for 15 minutes and the agitation stopped. When the mixture is acidic, it normally will have a light brown color. The lignin-solvent layer which separates produces approximately 350 gms. of lignin.

EXAMPLE 6

This example illustrates the separation of lignin from kraft black liquor by using a solvent such as methylene chloride which is a chlorinated hydrocarbon.

PROCEDURE: Charge 400 ml. (4 parts) of kraft black liquor (50% solids) into a one liter vessel. Add 100 ml. (1 part) of water and stir. Then add 100 ml. (1 part) of methylene chloride. While this mixture is being stirred, add 25 ml. (0.25 parts) of 80% acetic acid slowly over a 5-minute interval. As soon as the viscosity of the mixture starts to increase the stirring may be discontinued and a layer starts to form which contains the lignin.

The pH of the solution in Examples 1 through 6 is normally kept between 4.5 and 6.5. These separations were all carried out at about room temperature or slightly lower.

EXAMPLE 7

This example illustrates the extraction of lignin from kraft black liquor into an organic solvent by reducing the pH but still maintaining a basic solution.

PROCEDURE: Charge 4000 ml. kraft black liquor (50% solids) into a 5-gallon vessel with some means of agitation. Then add 4000 ml. (4 parts) of water and stir. Then add 1400 ml. (1.4 parts) of mesityl oxide and stir for 5 minutes. While the mixture is being stirred, 300 ml. (0.3 part) of 80% acetic acid is added slowly over 15 minutes until the pH of the mixture is still alkaline, between about 7.5 and 8.5. The mixture is then stirred for an additional 15 minutes, and the agitation stopped and the vessel covered. A lignin-containing layer separates which contains about 670 gms. of lignin.

EXAMPLE 8

This example illustrates the extraction of lignin from kraft black liquor into an organic solvent by acidifying with a mineral acid.

PROCEDURE: Charge 4000 ml. (4 parts) of kraft black liquor (50% solids) into a 5-gallon vessel equipped with some means of agitation. Then add 4000 ml. (4 parts) of water and stir. Then add 2000 ml. (2 parts) of mesityl oxide and stir for 5 minutes. Premix 150 ml. (0.15 part) of concentrated sulfuric acid into 1000 ml. (1 part) of water. Then add this sulfuric acid solution slowly over 15 minutes while the mixture is under agitation. When the color of the mixture becomes a light brown the mixture is then acidic and the addition of acid is stopped when the pH is in the range of 5 to 6.5 pH units. The agitation is continued for an additional 15 minutes and then stopped. The 5-gallon vessel is then covered. The lignin layer contains 813 gms. of lignin.

EXAMPLE 9

This example illustrates the extraction of lignin from kraft black liquor into an organic solvent by acidifying with a gas that produces an acid in an aqueous solution.

PROCEDURE: Charge 4000 ml. (4 parts) kraft black liquor (50% solids) into a 5-gallon vessel equipped with some means of agitation. Then add 4000 ml. (4 parts) of water and stir. Then add 2000 ml. (2 parts) of mesityl oxide and stir for 5 minutes. While the mixture is under agitation, carbon dioxide gas is passed through a glass frit or bubbler immersed near the bottom of the mixture. The use of carbon dioxide gas is continued until the mixture is acidic (pH of less than 7.0). The rate is maintained so that no frothing occurs while the mixture is under agitation. After the mixture is acidic the carbon dioxide gas is discontinued and the mixture stirred for an additional 15 minutes. The agitation is stopped and the mixture covered. The solvent-lignin layer produces 711 gms. of lignin.

EXAMPLE 10

This example illustrates the extraction of lignin from kraft black liquor into an organic solvent by reducing the alkalinity but still maintaining a basic solution, with carbon dioxide gas.

PROCEDURE: Charge 4000 ml. (4 parts) kraft black liquor (50% solids) into a 5-gallon vessel equipped with some means of agitation. Then add 4000 ml. (4 parts) water and stir. Next add 2000 ml. (2 parts) of mesityl oxide and stir for 5 minutes. While the mixture is under agitation, carbon dioxide gas is passed through a glass frit or bubbler which is immersed at the bottom of the 5-gallon vessel. The rate is adjusted so that no frothing occurs while the mixture is being agitated. When the pH of the mixture is in the range 7 to 8.9 pH units, the carbon dioxide gas may be discontinued, however, the closer to an acid pH the better the yields will be. After the carbon dioxide gas is discontinued, the mixture is stirred for an additional 15 minutes. The agitation is then stopped and the vessel covered. The lignin layer produces 665 gms. of lignin.

EXAMPLE 11

This example illustrates the extraction of lignin from kraft black liquor into an organic solvent by reducing the alkalinity of the black liquor with a mineral acid but still maintaining a pH of 7 or greater.

PROCEDURE: Charge 4000 ml. (4 parts) of kraft black liquor (50% solids) into a 5-gallon vessel equipped with some means of agitation. Then add 4000 ml. (4 parts) of water and stir. Next add 2000 ml. (2 parts) of mesityl oxide and stir for 5 minutes. Premix 100 ml. (0.1 part) of concentrated sulfuric acid into 1000 ml. (1 part) of water. This sulfuric acid solution is then added slowly to the mixture under agitation over a 15-minute period. The amount of acid needed will vary, because of the varying amounts of base present in kraft pulps. Therefore, the addition of acid is stopped when the desired pH is reached. In this example a pH of 7.5 to 8.0 was sufficient. After the acid has been added, the mixture is stirred for an additional 15 minutes. Then the agitation is stopped and the vessel covered. The lignin layer produces 710 gms. of lignin.

EXAMPLE 12

This example illustrates the extraction of lignin from kraft black liquor into the organic solvent methyl heptyl ketone by acidifying the solution.

PROCEDURE: Charge 4000 ml. (4 parts) of kraft black liquor (50% solids) into a 5-gallon vessel equipped with some means of agitation. Then add 2000 ml. (2 parts) of water and stir. Next add 4000 ml. (4 parts) of methyl heptyl ketone and stir for 5 minutes. Then slowly add 550 ml. (0.55 part) of 80% acetic acid over a 15-minute interval while the mixture is being stirred. When the mixture is acidic (pH 5.5 to 6.0) the addition of acid is discontinued and the mixture stirred for an additional 15 minutes. When the agitation has stopped, the vessel is covered. The lignin layer produces 578 gms. of lignin.

EXAMPLE 13

This example illustrates the extraction of lignin into the organic solvent 2, 2, butoxy, ethoxy, ethyl acetate, from kraft black liquor.

PROCEDURE: Charge 4000 ml. (4 parts) of kraft black liquor (50% solids) into a 5-gallon vessel equipped with some means of agitation. Then add 4000 ml. (4 parts) of water and stir. Next add 4000 ml. (4 parts) of 2, 2, butoxy, ethoxy, ethyl acetate and stir for 5 minutes. Then slowly add 550 ml. (0.55 part) of 80% acetic acid over a 15-minute interval while the mixture is being agitated. Once the mixture is acidic (pH 5.5 to 6) the addition of acid is discontinued and the mixture is stirred for an additional 15 minutes. After the agitation has stopped, the vessel is then covered and a layer will start to form. The lignin layer produces 435 gms. of lignin.

EXAMPLE 14

This example illustrates the extraction or separation of lignin from kraft black liquor into the organic solvent benzaldehyde.

PROCEDURE: Charge 4000 ml. (4 parts) of kraft black liquor (50% solids) into a 5-gallon vessel equipped with some means of agitation. Then add 1000 ml. (1 part) of water and stir. Next add 5000 ml. (5 parts) of benzaldehyde and stir for 5 minutes. Then slowly add 550 ml. (0.55 part) of 80% acetic acid over a 15-minute interval until the mixture is weakly acidic (pH 5.5 to 6). Then the addition of acid is discontinued and the mixture stirred for an additional 10 minutes. After the agitation has stopped, the vessel is then covered. Because of the density of benzaldehyde, the layer containing lignin may not rise to the top, since the density of the benzaldehyde lignin layer may be greater than the density of the aqueous mixture. The lignin layer produces 756 gms. of lignin.

EXAMPLE 15

This example illustrates the extraction of lignin from kraft black liquor into a combination of organic solvents, such as xylenes and furfural. In order to achieve the optimum extraction or separation, it may be advantageous to combine various solvents to obtain improved results.

PROCEDURE: Charge 4000 ml. (4 parts) of kraft black liquor (50% solids) into a 5-gallon vessel. Then add 2000 ml. (2 parts) of water and stir. Premix 2000 ml. (2 parts) of furfural and 2000 ml. (2 parts) of xylene and then add this premix and stir for 10 minutes. Next slowly add 550 ml. (0.55 part) of 80% acetic acid to the mixture over a 15-minute interval. Once the mixture has become acidic (preferably in the pH range 5.0 to 6.5), the addition of acid is stopped and the mixture is stirred for an additional 15 minutes. Then agitation is stopped and the vessel covered. The formation of a layer will be complete in 4 to 5 hours. The lignin layer produces 465 gms. of lignin. The xylene in this example acts as a carrier or extender for the furfural and improves the extraction economics. The xylene used was a commercial grade which contained m-xylene, o-xylene, p-xylene and ethyl benzene. Toluene and benzene might also be used as a carrier or extender.

EXAMPLE 16

This example illustrates the separation of lignin from kraft black liquor by using mesityl oxide with a mixture of xylenes while reducing the alkalinity of the solution but still maintaining a basic pH.

PROCEDURE: Charge 8000 ml. (8 parts) of kraft black liquor (50% solids) into a 5-gallon vessel equipped with some means of agitation. Then add 4000 ml. (4 parts) of water and stir. Then premix 200 ml. (0.2 part) of mesityl oxide with 1000 ml. (1 part) of a xylene solvent which consists of a mixture of ortho and para xylene as well as some ethyl benzene. This premix is then added to the black liquor solution and stirred for 5 minutes. While the mixture is being stirred 500 ml. (0.5 part) of 80% acetic acid is added slowly over 5 minutes. The viscosity of the mixture starts to thicken and then thins out again. At this time another 100 ml. (0.1 part) of 80% acetic acid is added until the pH of the mixture is in the preferred range of 7.8 to 8.2. The mixture is then stirred for another 5 minutes, and then the agitation stopped. The mixture is then allowed to stand and at the end of one-half hour a layer has formed which contains 1950 gms. of lignin.

EXAMPLE 17

This example illustrated the extraction or separation of lignin from kraft black liquor (50% solids) with cyclohexanone, an organic ketone.

PROCEDURE: Charge 4000 ml. (4 parts) of kraft black liquor into a 5-gallon vessel provided with some means of agitation. Then add 1000 ml. (1 part) water and stir. To this mixture is then added 2000 ml. (2 parts) of cyclohexanone and stirred for 5 minutes. Then 350 ml. (0.35 part) of 80% acetic acid is added slowly over a 15-minute interval, until the mixture is acidic. The addition of acid is stopped if the mixture starts to foam due to the evolution of gases. The mixture is stirred for 15 minutes and the agitation stopped. When the mixture is acidic, it normally will have a light brown color. The lignin layer which separates produces 805 gms. of lignin.

EXAMPLE 18

This example illustrates the separation or extraction of lignin from kraft black liquor (50% solids) with isophorone, an organic ketone.

PROCEDURE: Charge 4000 ml. (4 parts) of kraft black liquor into a 5-gallon vessel provided with some means of agitation. Then add 1000 ml. (1 part) with water and stir. To this mixture is then added 2000 ml. (2 parts) of isophorone and stirred for 5 minutes. Then 350 ml. (0.35 part) of 80% acetic acid is added slowly over a 15-minute interval, until the mixture is acidic. The addition of acid is stopped if the mixture starts to foam due to the evolution of gases. The mixture is stirred for 15 minutes and the agitation stopped. When the mixture is acidic, it normally will have a light brown color. The lignin layer which separates produces 910 gms. of lignin.

EXAMPLE 19

This example illustrates the extraction of lignin from kraft lignin black liquor (50% solids) with valeraldehyde, an organic aldehyde.

PROCEDURE: Charge 4000 ml. (4 parts) of kraft black liquor into a 5-gallon vessel provided with some means of agitation. Then add 1000 ml. (1 part) water and stir. To this mixture is then added 2000 ml. (2 parts) of valeraldehyde and stirred for 5 minutes. Then 350 ml. (0.35 part) of 80% acetic acid is added slowly over a 15-minute interval, until the mixture is acidic. The addition of acid is stopped if the mixture starts to foam due to the evolution of gases. The mixture is stirred for 15 minutes and the agitation stopped. When the mixture is acidic, it normally will have a light brown color. The lignin layer which separates produces 715 gms. of lignin.

EXAMPLE 20

This example illustrates the separation or extraction of lignin from kraft black liquor with butyraldehyde, an organic aldehyde.

PROCEDURE: Charge 4000 ml. (4 parts) of kraft black liquor into a 5-gallon vessel provided with some means of agitation. Then add 1000 ml. (1 part) water and stir. To this mixture is then added 2000 ml. (2 parts) of butyraldehyde and stirred for 5 minutes. Then 350 ml. (0.35 part) of 80% acetic acid is added slowly over a 15-minute interval, until the mixture is acidic. The addition of acid is stopped if the mixture starts to foam due to the evolution of gases. The mixture is stirred for 15 minutes and the agitation stopped. When the mixture is acidic, it normally will have a light brown color. The lignin layer which separates produces 435 gms. of lignin.

EXAMPLE 21

This example illustrates the separation or extraction of lignin from kraft black liquor (50% solids) into butyl ether, an organic ether.

PROCEDURE: Charge 4000 ml. (4 parts) of kraft black liquor into a 5-gallon vessel provided with some means of agitation. Then add 1000 ml. (1 part) water and stir. To this mixture is then added 2000 ml. (2 parts) of butyl ether and stirred for 5 minutes. Then 350 ml. (0.35 part) of 80% acetic acid is added slowly over a 15-minute interval, until the mixture is acidic. The addition of acid is stopped if the mixture starts to foam due to the evolution of gases. The mixture is stirred for 15 minutes and the agitation stopped. When the mixture is acidic, it normally will have a light brown color. The lignin layer which separates produces 565 gms. of lignin.

EXAMPLE 22

This example illustrates the separation or extraction of lignin from kraft black liquor (50% solids) with hexyl acetate, an organic ester.

PROCEDURE: Charge 4000 ml. (4 parts) of kraft black liquor into a 5-gallon vessel provided with some means of agitation. Then add 1000 ml. (1 part) water and stir. To this mixture is then added 2000 ml. (2 parts) of hexyl acetate and stirred for 5 minutes. Then 350 ml. (0.35 part) of 80% acetic acid is added slowly over a 15-minute interval, until the mixture is acidic. The addition of acid is stopped if the mixture starts to foam due to the evolution of gases. The mixture is stirred for 15 minutes and the agitation stopped. When the mixture is acidic, it normally will have a light brown color. The lignin layer which separates produces 407 gms. of lignin.

EXAMPLE 23

This example illustrates the separation or extraction of lignin from kraft black liquor (50% solids) with heptyl acetate, an organic ester.

PROCEDURE: Charge 4000 ml. (4 parts) of kraft black liquor into a 5-gallon vessel provided with some means of agitation. Then add 1000 ml. (1 part) water and stir. To this mixture is then added 2000 ml. (2 parts) of heptyl acetate and stirred for 5 minutes. Then 350 ml. (0.35 part) of 80% acetic acid is added slowly over a 15-minute interval until the mixture is acidic. The addition of acid is stopped if the mixture starts to foam due to the evolution of gases. The mixture is stirred for 15 minutes and the agitation stopped. When the mixture is acidic, it normally will have a light brown color. The lignin layer which separates produces 420 gms. of lignin.

EXAMPLE 24

This example illustrates the separation or extraction of lignin from kraft black liquor (50% solids) with amyl acetate, an organic ester.

PROCEDURE: Charge 4000 ml. (4parts) of kraft black liquor into a 5-gallon vessel provided with some means of agitation. Then add 1000 ml. (1 part) water and stir. To this mixture is then added 2000 ml. (2 parts) of amyl acetate and stirred for 5 minutes. Then 350 ml. (0.35 part) of 80% acetic acid is added slowly over a 15-minute interval, until the mixture is acidic. The addition of acid is stopped if the mixture starts to foam due to the evolution of gases. The mixture is stirred for 15 minutes and the agitation stopped. When the mixture is acidic, it normally will have a light brown color. The lignin layer which separates produces 570 gms. of lignin.

EXAMPLE 25

This example illustrates the separation or extraction of lignin from kraft liquor (50% solids) into iso-amyl acetate, an organic ester.

PROCEDURE: Charge 4000 ml. (4 parts) of kraft black liquor into a 5-gallon vessel provided with some means of agitation. Then add 1000 ml. (1 part) water and stir. To this mixture is then added 2000 ml. (2 parts) of iso-amyl acetate and stirred for 5 minutes. Then 350 ml. (0.35 part) of 80% acetic acid is added slowly over a 15-minute interval, until the mixture is acidic. The addition of acid is stopped if the mixture starts to foam due to the evolution of gases. The mixture is stirred for 15 minutes and the agitation stopped. When the mixture is acidic, it normally will have a light brown color. The lignin layer which separates produces 580 gms. of lignin.

EXAMPLE 26

This example illustrates the separation or extraction of lignin from kraft black liquor (50% solids) into phenyl acetate, an organic ester.

PROCEDURE: Charge 4000 ml. (4 parts) of kraft black liquor into a 5-gallon vessel provided with some means of agitation. Then add 1000 ml. (1 part) water and stir. To this mixture is then added 2000 ml. (2 parts) of phenyl acetate and stirred for 5 minutes. Then 350 ml. (0.35 part) of 80% acetic acid is added slowly over a 15-minute interval, until the mixture is acidic. The addition of acid is stopped if the mixture starts to foam due to the evolution of gases. The mixture is stirred for 15 minutes and the agitation stopped. When the mixture is acidic, it normally will have a light brown color. The lignin layer which separates produces 850 gms. of lignin.

The lignin layer containing the solvent and lignin in the examples above may be utilized in exactly this form or the lignin may be separated from the solvent simply by drying or spray drying which simply evaporates the solvent under atmospheric or vacuum conditions leaving the lignin in solid form. The following Example 26A illustrates this method of drying.

EXAMPLE 26A

This example illustrates the preparation of a spray-dried lignin powder, from kraft black liquor.

PROCEDURE: Charge 4000 gms. (4 parts) of the solvent-lignin layer separated in Example 16 into a 5-gallon vessel. Then add 2000 gms. (2 parts) of a volatile solvent such as acetone or methyl ethyl ketone and stir. This mixture is then spray-dried where the reduced pressure removes the solvents and the powdered lignin remains.

This method of recovery of lignin from waste black liquor from the kraft process is highly advantageous over previous methods which involved the precipitating of lignin from an aqueous solution, filtering the lignin and then drying the lignin. Lignin so precipitated is to some degree in colloidal form and in such form will pass through most filters and to this extent is not recoverable. The present invention allows the lignin to be purified by the separation of the inorganic materials including the pulping chemicals into the water layer, as well as all water-soluble material. This is very useful because a polymer may be made from the lignin without having the materials in the water layer interfere with the properties of the polymer. Another advantage is that the lignin-solvent combination presents the lignin in a liquid phase where it can be conveniently reacted with other chemicals to produce other useful end products such as resins, adhesives, paints and the like.

The uses of lignin so recovered are extensive. Lignins have found extensive uses as fillers and extenders for various resins. It has been used as a dispersant, emulsifier, grinding aid, protein precipitator, and sequestering agent depending on the particular nature of the lignin.

Lignin can be converted chemically to organic chemicals, for example vanillin, methyl mercaptan and dimethyl sulfide. The potential uses of lignin are quite extensive.

The following examples illustrate the use of the lignin-solvent layer produced in accordance with the teachings of Examples 1 through 26, to make a useful end product of an epoxide-lignin resin by way of various chemical intermediates. These examples relate to producing unsaturated reactive end groups on the lignin molecule which end groups are readily amenable to epoxidation to produce epoxide-lignin resins. These examples include the placing of an unsaturated carbonyl group on the lignin molecule such as an unsaturated ketone ester, aldehyde or acid. They also include the placing of an unsaturated nitrogen containing compound on the lignin molecule such as an unsaturated nitrile or amide.

EXAMPLE 27

This example illustrates the reaction of extracted or separated lignin with mesityl oxide and formaldehyde, to produce a lignin unsaturated carbonyl intermediate.

PROCEDURE: Charge 1000 gms. (1 part) of the lignin-solvent layer from Example 5 into a 5-liter, 3-neck, round-bottom flask equipped with a thermometer, dropping funnel and mechanical stirrer. Add 200 ml. (0.2 part) of 38% aqueous formaldehyde dropwise over a 10-minute interval, while stirring. Then add 200 ml. (0.2 part) of deionized water and stir for 5 minutes and add 30 ml. (0.03 part) of triethylamine and stir for 30 minutes. The dropping funnel is replaced with a water-cooled condenser. The mixture is now heated to reflux and refluxed for 30 minutes. The heat is removed and the mixture is stirred while cooling to room temperature. All of the materials appear as seemingly a homogenous liquid. This reaction of the lignin, mesityl oxide and formaldehyde is believed to put unsaturated carbonyl groups onto the lignin molecule. These groups are reactive and may be epoxidized as is disclosed in further examples.

EXAMPLE 28

This example illustrates the preparation of an unsaturated carbonyl intermediate from extracted lignin, mesityl oxide and formaldehyde.

PROCEDURE: Charge 1600 gms. (1.6 parts) of the separated lignin-solvent layer from Example 5 into a 5-liter, 3-neck, round-bottom flask equipped with a dropping funnel thermometer, and mechanical stirrer. Then add 100 ml. (0.1 part) of 38% aqueous formaldehyde dropwise over 15 minutes while the extracted lignin is being stirred. Then add 300 ml. (0.3 part) of deionized water, over a 10-minute interval. The mixture is stirred while 30 ml. (0.03 part) of triethylamine is added dropwise over a 10-minute interval. The mixture is then stirred for half an hour. The dropping funnel is replaced with a water-cooled condenser. The mixture is heated to reflux which requires a half hour. Then the mixture is refluxed for 30 minutes and then cooled to room temperature over 30 minutes. The lignin is believed to have an unsaturated carbonyl structure which is subsequently used for epoxidation.

EXAMPLE 29

This example illustrates the preparation of a reaction intermediate using mesityl oxide and formaldehyde. In order to increase the number of unsaturated carbonyl groups the amount of mesityl oxide and formaldehyde is increased accordingly.

PROCEDURE: Charge 1600 gms. (1.6 parts) of the separated lignin-mesityl oxide from Example 5 into a 5-liter, 3-neck, round-bottom flask equipped with a dropping funnel, thermometer and mechanical stirrer. Then add 200 ml. (0.2 part) of mesityl oxide and stir for 15 minutes. Then add 300 ml. (0.3 part) of 38% aqueous formaldehyde dropwise over a 15-minute interval while the mixture is being stirred. To the mixture is then added 200 ml. (0.2 part) of deionized water dropwise over a 10-minute interval. Then 40 ml. (0.04 part) of triethylamine is added dropwise over a 10-minute interval. The dropping funnel is replaced by a water-cooled condenser and the mixture is agitated for one-half hour and heated to reflux. The mixture is refluxed for one hour and afterwards cooled to room temperature.

EXAMPLE 30

This example illustrates the preparation of a reactive intermediate which can be used to prepare a lignin-epoxy resin which has a relatively high number of epoxy groups.

PROCEDURE: Charge 1600 gms. (1.6 parts) of extracted or separated lignin-solvent from Example 5 into a 5-liter, 3-neck, round-bottom flask equipped with a dropping funnel thermometer, and mechanical stirrer. Then add 400 ml. (0.4 part) of mesityl oxide and stir for 15 minutes. Then add 400 ml. (0.4 part) of 38% aqueous formaldehyde over a 30-minute interval. To the mixture is then added 200 ml. (0.2 part) of deionized water dropwise over a 10-minute interval. Then 50 ml. (0.05 part) of triethylamine is added dropwise over a 10-minute interval. The dropping funnel is replaced by a water-cooled condenser and the mixture stirred for 30 minutes, and then heated to reflux. The mixture is refluxed for one hour and 30 minutes and afterwards, cooled to room temperature by removing the heat and allowing the mixture to stir.

Examples 27, 28, 29 and 30 have illustrated the use of the lignin-solvent material from Example 5 in the reaction to produce the unsaturated carbonyl group on the lignin molecule. It will be understood by those skilled in the art that the lignin-solvent separation from all of the Examples 1 through 26 can be used in essentially the same way.

EXAMPLE 31

This example illustrates the epoxidation of a reactive intermediate prepared from lignin, mesityl oxide and formaldehyde with hydrogen peroxide.

PROCEDURE: Charge 2000 gms. (2 parts) of Example 27 into a 5-liter, 3-neck, round-bottom flask, equipped with a dropping funnel, thermometer and mechanical stirrer. Cool the mixture to 5° to 10° C with an ice bath or other cooling equipment. Premix 10 gms. (0.01 part) of magnesium sulfate in 100 ml. (0.1 part) of deionized water. Add this to the mixture dropwise over a 10-minute interval while the mixture is being stirred. Premix 11 gms. of sodium hydroxide in 100 ml. (0.1 part) of deionized water. While the mixture is being maintained between 5° and 10° C with an ice bath, 30 ml. (0.03 part) of 30% hydrogen perioxide is added dropwise over 30 minutes. The mixture is constantly being stirred during this addition. If the temperature should rise above 10° C, the addition of hydrogen peroxide is stopped until the temperature is less than 10° C. Once the addition of hydrogen peroxide is complete, 400 ml. (0.4 part) of deionized water is added and the mixture is stirred for one hour while the temperature is maintained between 5° and 10° C. Then 100 gms. (0.1 part) of sodium sulfate is added and the mixture stirred for 15 minutes. Afterwards, the mixture is poured into a separatory funnel. After 2 hours a layer of epoxy-lignin has started to form on the top part of the separatory funnel and the undissolved sodium sulfate settles on the bottom. This occurs as long as the lignin-epoxy has a density less than that of the solution. The presence of low density solvents would enhance the separation if the lignin-epoxy has a density greater than the solution and settles to the bottom. After the formation of a layer is complete, the lignin-epoxy can be separated, and then utilized as an epoxy-resin.

EXAMPLE 32

This example illustrates the preparation of a lignin-epoxy containing four times the epoxy groups as in Example 31.

PROCEDURE: Charge 2000 gms. (2 parts) of Example 29 into a 5-liter, 3-neck, round-bottom flask equipped with a dropping funnel, thermometer and mechanical stirrer. Cool the mixture from 5° to 10° C with an ice bath or other cooling equipment. Premix 10 gms. (0.01 part) of magnesium sulfate into 100 ml. (0.1 part) of deionized water. Add this to the mixture dropwise over a 10-minute interval while the mixture is being stirred. Premix 11 gms. of sodium hydroxide in 100 ml. (0.1 part) of deionized water. While the mixture is being maintained between 5° and 10° C with an ice bath, 120 ml. (0.120 part) of 30% aqueous hydrogen peroxide is added dropwise over 30 minutes. The mixture is constantly being stirred during this addition. If the temperature should rise over 10° C, the addition of hydrogen peroxide is stopped until the temperature is less than 10° C. Once the addition of hydrogen peroxide is complete, 400 ml. (0.4 part) of deionized water is added and the mixture is stirred for one hour while the temperature is maintained between 5° to 10° C. Then 100 gms. (0.1 part) of sodium sulfate is added and the mixture stirred for 15 minutes. Afterwards, the mixture is poured into a separatory funnel. After two hours, a layer of epoxy-lignin has started to form on the top part of the separatory funnel and the undissolved sodium sulfate settles on the bottom.

EXAMPLE 33

This example illustrates the preparation of a lignin-epoxy containing eight times the epoxy groups as in Example 31.

PROCEDURE: Charge 2000 gms. (2 parts) of Example 30 into a 5-liter, 3-neck, round-bottom flask equipped with a dropping funnel, thermometer, and mechanical stirrer. Cool the mixture between 5° to 10° C with an ice bath or other cooling equipment. Premix 10 gms. (0.01 part) of magnesium sulfate into 100 ml. (0.1 part) of deionized water. Add this to the mixture dropwise over a 10-minute interval while the mixture is being stirred. Premix 11 gms. of sodium hydroxide in 100 ml. (0.1 part) of deionized water. While the mixture is being maintained between 5° and 10° C with an ice bath, 240 ml. (0.240 part) of 30% aqueous hydrogen peroxide is added dropwise over one hour. The mixture is constantly being stirred during this addition. If the temperature should rise above 10° C, the addition of hydrogen peroxide is stopped until the temperature is less than 10° C. Once the addition of hydrogen peroxide is complete, 400 ml. (0.4 part) of deionized water is added and the mixture is stirred for one hour while the temperature is being maintained between 5° to 10° C. Then 100 gms. (0.1 part) of sodium sulfate is added and the mixture stirred for 15 minutes. Afterwards, the mixture is poured into a separatory funnel. After two hours, a layer has started to form on the top part of the separatory funnel and the undissolved sodium sulfate settles on the bottom.

EXAMPLE 34

This example illustrates the preparation of epoxide groups on the lignin molecule by reacting lignin that contains unsaturated carbonyl groups with sodium peroxide.

PROCEDURE: Charge 2000 gms. (2 parts) of Example 27 into a 5-liter, 3-neck, round-bottom flask equipped with a dropping funnel, thermometer and mechanical stirrer. Cool the mixture to 5° to 10° C with an ice bath or other cooling equipment. Premix 10 gms. (0.01 part) of magnesium sulfate into 100 ml. (0.1 part) of deionized water. Add this to the mixture dropwise over a 10-minute interval while the mixture is being stirred. Premix 11 gms. of sodium hydroxide in 100 ml. (0.1 part) of deionized water. While the mixture is being maintained between 5° and 10° C with an ice bath, 20 gms. (0.02 part) of sodium peroxide is added gradually over 30 minutes. The mixture is constantly being stirred during this addition. If the temperature should rise above 10° C, the addition of hydrogen peroxide is stopped until the temperature is less than 10° C. Once the addition of sodium peroxide is complete, 400 ml.

(0.4 part) of deionized water is added and the mixture is stirred for one hour while the temperature is being maintained between 5° to 10° C. Then 100 gms. (0.1 part) of sodium sulfate is added and the mixture stirred for 15 minutes. Afterwards, the mixture is poured into a separatory funnel. After two hours, a layer has started to form on the top part of the separatory funnel and the dissolved sodium sulfate settles on the bottom. This occurs as long as the lignin-epoxy has a density less than that of the solution. The presence of low-density solvents would enhance the separation if the lignin-epoxy has density greater than the solution and settles to the bottom. After the formation of a layer is complete, the lignin-epoxy can be separated, and then utilized as an epoxy-resin.

EXAMPLE 35

This example illustrates the epoxidation of a reactive intermediate prepared from mesityl oxide, lignin and formaldehyde by sodium peroxide.

PROCEDURE: Charge 2000 gms. (2 parts) of Example 29 into a 5-liter, 3-neck, round-bottom flask equipped with a dropping funnel, thermometer and mechanical stirrer. Cool the mixture between 5° to 10° C with an ice bath or other cooling equipment. Premix 10 gms. (0.01 part) of magnesium sulfate into 100 ml. (0.1 part) of deionized water. Add this to the mixture dropwise over a 10-minute interval while the mixture is being stirred. Premix 11 gms. of sodium hydroxide in 100 ml. (0.1 part) of deionized water. While the mixture is being maintained between 5° to 10° C with an ice bath, 20 gms. (0.02 part) of sodium peroxide is added gradually over 30 minutes. The mixture is constantly being stirred during this addition. If the temperature should rise above 10° C, the addition of hydrogen peroxide is stopped until the temperature is less than 10° C. Once the addition of sodium peroxide is complete, 40 ml. (0.4 part) of deionized water is added and the mixture is stirred for one hour while the temperature is being maintained between 5° 10° C. Then 100 gms. (0.1 part) of sodium sulfate is added and the mixture stirred for 15 minutes. Afterwards, the mixture is poured into a separatory funnel. After two hours, a layer has started to form on the top part of the separatory funnel and the undissolved sodium sulfate settles on the bottom.

EXAMPLE 36

This example illustrates the preparation of a lignin-epoxy containing twice the epoxy groups as Example 35.

PROCEDURE: charge 2000 gms. (2 parts) of Example 29 into a 5-liter, 3-neck, round-bottom flask equipped with a dropping funnel, thermometer, and mechanical stirrer. Cool the mixture between 5° to 10° C with an ice bath. Premix 10 gms. (0.01 part) of magnesium sulfate into 100 ml. (0.1 part) of deionized water. Add this to the mixture dropwise over a 10-minute interval while the mixture is stirred. Premix 11 gms. (0.11 part) of sodium hydroxide in 100 ml. (0.1 part) of deionized water. While the mixture is being maintained between 5° to 10° C with an ice bath, 40 gms. (0.04 part) of sodium peroxide is added gradually over a 45-minute period. The mixture is constantly being stirred during this addition. If the temperature should rise above 10° C, the addition of sodium peroxide is stopped until the temperature is less than 10° C. Once the addition of sodium peroxide is complete, 400 ml. (0.4 part) of deionized water is added and the mixture is stirred for one hour while being maintained in the 5° to 10° C range. Then 100 gms. (0.1 part) of sodium sulfate is added and the mixture stirrred for 15 minutes. Afterwards, the mixture is poured into a separatory funnel. After two hours, a layer has started to form on the top in the separatory funnel and the undissolved sodium sulfate settles on the bottom.

EXAMPLE 37

This example illustrates the epoxidation of a reactive lignin intermediate with sodium peroxide, which contains four times the epoxy groups as Example 35.

PROCEDURE: Charge 2000 gms. (2 parts) of Example 30 into a 5-liter, 3-neck, round-bottom flask equipped with a dropping funnel, thermometer and mechanical stirrer. Cool the mixture between 5° to 10° C with an ice bath. Premix 10 gms. (0.01 part) of magnesium sulfate into 100 ml. (0.1 part) of deionized water. Add this to the mixture dropwise over a 10-minute interval while the mixture is stirring. Premix 11 gms. (0.11 part) of sodium hydroxide in 100 ml. (0.1 part) of deionized water. While the mixture is being maintained between 5° to 10° C with an ice bath, 80 gms. (0.08 part) of sodium peroxide is added gradually over a one-hour period. The mixture is constantly being stirred during this addition. If the temperature should rise above 10° C, the addition of sodium peroxide is stopped until the temperature is less than 10° C. Once the addition of sodium peroxide is complete, 400 ml. (0.4 part) of deionized water is added and the mixture is stirred for one hour while being maintained in the 5° to 10° C range. Then 100 gms. (0.1 part) of sodium sulfate is added and the mixture stirred for 15 minutes. Afterwards, the mixture is poured into a separatory funnel. After two hours, a layer has started to form on the top in the separatory funnel and the undissolved sodium sulfate settles on the bottom.

EXAMPLE 38

This example illustrates the reaction of acrylonitrile with lignin to produce an unsaturated amide or intermediate which is chemically bonded to the lignin molecule. This unsaturated intermediate can then be epoxidized using the procedures of Examples 31 through 37.

PROCEDURE: Charge 1600 gms. (1.6 parts) of the separated lignin-butyl ether from Example 21 into a 5-liter, 3-neck, round-bottom flask equipped with a dropping funnel, thermometer and mechanical stirrer. Then add 200 ml. (0.2 part) of acrylonitrile and stir for 15 minutes. Then add 300 ml. (0.3 part) of 38% aqueous formaldehyde dropwise over a 15-minute interval while the mixture is being stirred. To the mixture is then added 200 ml. (0.2 part) of deionized water dropwise over a 10-minute interval. Then 40 ml. (0.04 part) of triethylamine is added dropwise over a 10-minute interval. The dropping funnel is replaced by a water-cooled condenser and the mixture is agitated for one-half hour and heated to reflux. The mixture is refluxed for one hour and afterwards, cooled to room temperature.

EXAMPLE 39

This example illustrates the rection of acrolein with lignin to produce an unsaturated carbonyl which is chemically bonded to the lignin molecule. This can be epoxidized by the procedure of Examples 31 through 37.

PROCEDURE: Charge 1600 gms. (1.6 parts) of the separated lignin-mesityl oxide from Example 21 into a 5-liter, 3-neck, round-bottom flask equipped with a dropping funnel, thermometer, and mechanical stirrer. Then add 200 ml. (0.2 part) of acrolein and stir for 15 minutes. Then add 300 ml. (0.3 part) of 38% aqueous formaldehyde dropwise over a 15-minute interval while the mixture is being stirred. To the mixture is then added 200 ml. (0.2 part) of deionized water dropwise over a 10-minute interval. Then 40 ml. (0.04 part) of triethylamine is added dropwise over a 10-minute interval. The dropping funnel is replaced by a water-cooled condenser and the mixture is agitated for one-half hour and heated to reflux. The mixture is refluxed for one hour and afterwards, cooled to room temperature.

EXAMPLE 40

This example illustrates the reaction of extracted or separated lignin with cyanoacetic acid to produce an unsaturated nitrile which is chemically bonded to the lignin molecule.

PROCEDURE: Charge 2000 gms. (2 parts) of extracted or separated lignin from Example 16 into a 5-liter, 3-neck, round-bottom flask equipped with a mechanical stirrer, thermometer and dropping funnel. Then premix 40 gms. (0.04 part) of sodium hydroxide in 300 ml. of deionized water and add dropwise over 15 minutes. The mixture is then stirred for 15 minutes. Then premix 100 gms. (0.1 part) of cyanoacetic acid in 200 gms. (0.2 part) of deionized water. Add this mixture dropwise over a period of one-half hour. Then stir this mixture at room temperature for one hour. Then heat to reflux and reflux for one hour. Afterwards, the mixture is cooled to room temperature.

EXAMPLE 41

This example illustrates the reaction of extracted or separated lignin with ethyl cyanoacetate to produce an unsaturated nitrile which is chemically bonded to the lignin molecule.

PROCEDURE: Charge 2000 gms. (2 parts) of extracted or separated lignin from Example 16 into a 5-liter, 3-neck, round-bottom flask equipped with a mechanical stirrer, thermometer and dropping funnel. Then premix 40 gms. (0.04 part) of sodium hydroxide in 300 ml. of deionized water and add dropwise over 15 minutes. The mixture is then stirred for 15 minutes. Then premix 100 gms. (0.1 part) of ethyl cyanoacetate in 200 gms. (0.2 part) of deionized water. Add this mixture dropwise over a period of one-half hour. Then stir this mixture at room temperature for one hour. Then heat to reflux and reflux for one hour. Afterwards, the mixture is cooled to room temperature.

EXAMPLE 42

This example illustrates the reaction of extracted or separated lignin with methyl cyanoacetate to produce an unsaturated nitrile which is chemically bonded to the lignin molecule.

PROCEDURE: Charge 2000 gms. (2 parts) of extracted or separated lignin from Example 16 into a 5-liter, 3-neck, round-bottom flask equipped with a mechanical stirrer, thermometer and dropping funnel. Then premix 40 gms. (0.04 part) of sodium hydroxide in 300 ml. of deionized water and add dropwise over 15 minutes. Then premix 100 gms. (0.1 part) of methyl cyanoacetate in 200 gms. (0.2 part) of deionized water. Add this mixture dropwise over a period of one-half hour. Then stir this mixture at room temperature for one hour. Then heat to reflux and reflux for one hour. Afterwards, the mixture is cooled to room temperature.

EXAMPLE 43

This example illustrates the reaction of lignin with diethyl malonate to produce an unsaturated ester which can then be epoxidized.

PROCEDURE: Charge 2000 gms. (2 parts) of extracted or separated lignin from Example 16 into a 5-liter, 3-neck, round-bottom flask equipped with a mechanical stirrer, thermometer and dropping funnel. Then premix 40 gms. (0.04 part) of sodium hydroxide in 300 ml. of deionized water and add dropwise over 15 minutes. Then premix 100 gms. (0.1 part) of diethyl malonate in 200 gms. (0.2 part) of deionized water. Add this mixture dropwise over a period of one-half hour. Then stir this mixture at room temperature for one hour. Then heat to reflux and reflux for one hour. Afterwards, the mixture is cooled to room temperature.

EXAMPLE 44

This example illustrates the reaction of dimethyl malonate with extracted or separated lignin to produce an unsaturated ester which can then be epoxidized with alkaline hydrogen peroxide.

PROCEDURE: Charge 2000 gms. (2 parts) of extracted or separated lignin from Example 16 into a 5-liter, 3-neck, round-bottom flask equipped with a mechanical stirrer, thermometer, and dropping funnel. Then premix 40 gms. (0.04 part) of sodium hydroxide in 300 ml. of deionized water and add dropwise over 15 minutes. Then premix 100 gms. (0.1 part) of dimethyl malonate in 200 gms. (0.2 part) of deionized water. Add this mixture dropwise over a period of one-half hour. Then stir this mixture at room temperature for one hour. Then heat to reflux and reflux for one hour. Afterwards, the mixture is cooled to room temperature.

EXAMPLE 45

This example illustrates the reaction of extracted or separated lignin with malonic acid to produce an unsaturated acid which can then be epoxidized.

PROCEDURE: Charge 2000 gms. (2 parts) of extracted or separated lignin from Example 16 into a 5-liter, 3-neck, round-bottom flask equipped with a mechanical stirrer, thermometer, and dropping funnel. Then premix 40 gms. (0.04 part) of sodium hydroxide in 300 ml. of deionized water and add dropwise over 15 minutes. Then premix 100 gms. (0.1 part) of malonic acid in 200 gms. (0.02 part) of deionized water. Add this mixture dropwise over a period of one-half hour. Then stir this mixture at room temperature for one hour. Then heat to reflux and reflux for one hour. Afterwards, the mixture is cooled to room temperature.

Epoxidation of Examples 40 through 45 can be carried out in the same manner as disclosed in Examples 31 through 37.

The following examples teach the use of and method of making several end products from the epoxide-lignin resins of Examples 31 through 37.

EXAMPLE 46

This example illustrates the preparation of an adhesive from epoxidized lignin.

A.

100 parts epoxidized lignin (from Example 33)
50 parts tabular alumina

B.

50 parts Thiokol LP-30, (polysulfide resin) 10 parts DMP-30 tri-(dimethylaminoethyl) Phenol (catalyst)

PROCEDURE: The filler (tabular alumina) is mixed with the epoxidized lignin preferably by grinding on a 3-roll paint mill. Then the mixture of liquid polysulfide and catalyst is blended in, care being taken to avoid the entrapment of air. Both A and B are stable but their mixture has a short pot life, well under an hour, therefore, mix only enough for 10 to 15 minutes of operation. Because of DMP-30, cure can take place at room temperature.

EXAMPLE 47

This example illustrates the preparation of an adhesive from epoxidized lignin, with a polyamide resin such as Versamid 115 resin.

A.

100 parts of epoxidized lignin from Example 33.

B.

70 parts Versamid 115 resin.

C.

Filler as desired.

PROCEDURE: Simply blend all of the components together. The Versamids cure slowly at room temperature which allows for longer working times.

EXAMPLE 48

This example illustrates the preparation of an adhesive from epoxidized lignin, Versamid polyamide, and a curing agent to provide a faster cure.

A.

100 parts of epoxidized lignin from Example 33.

B. 35 parts Versamid 115

C.

5 parts DMP-30 tri-(dimethylaminoethyl) phenol (catalyst)

D.

Filler as desired

PROCEDURE: The filler is blended with the epoxidized lignin and a reactive diluent is added to reduce the viscosity if necessary.

EXAMPLE 49

This example illustrates the preparation of a plastic from epoxidized ligning.
PROCEDURE:

A.

100 parts of epoxidized lignin from Example 31.

B.

30 parts Lubrizol CA-23 epoxy curing agent (polyamide)

A and B are blended together and heated slowly until the mixture thins out. Then the mixture is heated under agiatation for one-half hour until droplets of the mixture form long fibers of approximately 2 ft. in length. At this time the mixture can then be cast into a mold. On cooling, a dark solid plastic results

EXAMPLE 50

This example illustrates the preparation of a plastic from epooxidized lignin by using an aliphatic amine curing agent.

A.

100 parts of epoxidized lignin from Example 32.

B.

15 parts triethylenetetramine

C.

100 parts of epoxidized lignin from Example 32.

PROCEDURE: Blend A and B and heat to 100° C for one-half hour and then add C. The mixture is then heated at 200° C until fibers 2 ft. long form from the droplets of the mixture. The mixture is then cast into a mold and a tough, dark plastic results.

EXAMPLE 51

This example illustrates the preparation of a plastic from epoxidized lignin and a polysulfide resin.

A.

100 parts of epoxidized lignin from Example 33.

B.

120 parts of Thiokol polysulfide resin (LP-3)

C.

10 parts of tri-(dimethyaminoethyl) phenol

PROCEDURE: Blend B and C and then add A and mix well for 10 minutes. The mixture is then poured into a mold and at the end of 6 hours, has cured to a tough plastic.

Another illustration of the invention involves the use of a lignin which has been separated from the waste black cooking liquor of the kraft pulping process in a manner different than that disclosed above.

This lignin is separated, in principle, by reducing the pH of the black liquor to a level where a lignin fraction precipitates or separates from the aqueous medium. This lignin is normally separated and dried resulting in a powder-like product. The lignin resulting may, also, be produced in a slurry-like suspension. The pH of the black liquor is normally reduced by the addition of an acid and separation of lignin may result at a pH 8 or 9 and, also, results at a pH below 7. This illustration of the invention is best understood from the following examples all of which involve the use of a lignin produced as just described above.

EXAMPLE 52

This example illustrates the reaction of lignin, produced as just described above, with mesityl oxide and formaldehyde to produce a lignin unsaturated carbonyl intermediate.

PROCEDURE: Dissolve 18 gms. (0.018 part) of sodium hydroxide into 1600 gms. (1.6 parts) of deionized water. Then slowly add 500 gms. (0.5 part) of Indulin AT (a powdered kraft lignin produced by Westvaco Corporation) while the mixture is agitated. Then charge this premix into a 5-liter, 3-neck, round-bottom flask equipped with a thermometer, dropping funnel, and mechanical stirrer. Add 98 gms. (0.098 part) of mesityl oxide dropwise over ten minutes while the mixture is agitated. Then add 80 gms. (0.08 part) of 40% aqueous formaldehyde dropwise over a ten-minute interval. To this mixture add 8 gms. (0.008 part) of triethylamine.

The dropping funnel is replaced with a water cooled condenser. The mixture is heated to reflux and refluxed for 30 minutes. The heat is removed and the mixture is stirred while cooling to room temperature. All of the materials appear as a seemingly homogenous liquid. This reaction of the lignin, mesityl oxide and formaldehyde is believed to put unsaturated carbonyl groups onto the lignin molecule. These groups are reactive and may be epoxidized as is disclosed in further examples.

EXAMPLE 53

This example illustrates the reaction of a lignin with mesityl oxide and formaldehyde to produce a lignin unsaturated carbonyl intermediate. This example will produce a lignin-epoxy resin with fewer epoxide groups than Example 52.

PROCEDURE: Dissolve 18 gms. (0.018 part) of sodium hydroxide into 1600 gms. (1.6 parts) of deionized water. Then slowly add 500 gms. (0.5 part) of Indulin AT (a powdered kraft lignin produced by Westvaco Corporation) while the mixture is being agitated. Then charge this premix into a 5-liter, 3-neck, round-bottom flask equipped with a thermometer, dropping funnel, and mechanical stirrer. Add 18 gms. (0.018 part) of mesityl oxide dropwise over ten minutes, while the mixture is agitated. Then add 14 gms. (0.014 part) of 40% aqueous formaldehyde dropwise over a ten-minute interval. To this mixture add 8 gms. (0.008 part) of triethylamine.

The dropping funnel is replaced with a water-cooled condenser. The mixture is heated to reflux and refluxed for 30 minutes. The heat is removed and the mixture is stirred while cooling to room temperature. All of the materials appear as a seemingly homogenous liquid. This reaction of the lignin, mesityl oxide and formaldehyde is believed to put unsaturated carbonyl groups onto the lignin molecule. These groups are reactive and may be epoxidized as is disclosed in further examples.

EXAMPLE 54

This example illustrates the epoxidation of a reactive intermediate prepared from lignin, such as Indulin At, mesityl oxide and formaldehyde with hydrogen peroxide.

PROCEDURE: Charge 2300 gms. (2.3 parts) of Example 52 into a 5-liter, 3-neck round bottom flask equipped with a dropping funnel, thermometer and mechanical stirrer. Cool the mixture to 5° to 10° C. with an ice bath or other cooling equipment.

Premix 8 gms. (0.008 parts) of magnesium sulfate in 200 gms. (0.2 parts) of deionized water. Add this mixture dropwise over a ten-minute interval while the mixture is being stirred. While the mixture is being maintained between 5° and 10° C. with an ice bath, 100 ml. (0.1 part) of 30% hydrogen peroxide is added dropwise over 30 minutes. The mixture is constantly being stirred during this addition. If the temperature should rise above 10° c, the addition of hydrogen peroxide is stopped until the temperature is less than 10° C. Once the addition of hydrogen peroxide is complete the mixture is stirred for one hour while the temperature is being maintained between 5° and 10° C. Then the mixture is poured into a 3000 ml. beaker or like container. Then 100 gms (0.1 part) of sodium sulfate is added and the mixture stirred for 15 minutes. The mixture now becomes very thick and the lignin-epoxy resin can now be easily separated by various means, such as filtering or spray drying. The resin can also be separated from the reaction medium by acidifying with acetic, sulfuric or hydrochloric acid or with carbon dioxide gas, which causes the lignin-epoxy resin to become insoluble thereby precipitating out of the reaction medium.

EXAMPLE 55

This example illustrates the epoxidation of a reactive intermediate prepared from lignin, such as Indulin AT, mesityl oxide and formaldehyde. This example also illustrates the separation of the final lignin-epoxy resin from the reaction mixture by the use of an acid such as acetic acid.

PROCEDURE: Charge 2300 gms. (2.3 parts) of Example 52 into a 5-liter, 3-neck round-bottom flask equipped with a dropping funnel, thermometer and mechanical stirrer. Cool the mixture to 5° to 10° C with an ice bath or other cooling equipment.

Premix 8 gms. (0.008 parts) of magnesium sulfate in 200 gms. (0.2 parts) of deionized water. Add this mixture dropwise over a ten-minute interval while the mixture is being stirred. While the mixture is being maintained between 5° and 10° C with an ice bath, 100 ml. (0.1 part) of 30% hydrogen peroxide is added dropwise over 30 minutes. The mixture is constantly being stirred during this addition. If the temperature should rise above 10° C, the addition of hydrogen peroxide is stopped until the temperature is less than 10° C. Once the addition of hydrogen peroxide is complete the mixture is stirred for one hour while the temperature is being maintained between 5° and 10° C. Premix 30 ml. (0.03 part) of glacial acetic acid in 70 ml. (0.07 part) of deionized water. This premix is then added slowly to the reaction mixture while it is being agitated. The mixture becomes very thick and the epoxy-lignin resin is no longer watersoluble and can be easily separated from the reaction solvents by various means such as filtering or spray-drying.

EXAMPLE 56

This example illustrates the epoxidation of a reactive intermediate prepared from lignin, such as Indulin AT, mesityl oxide and formaldehyde at 25° C. instead of 5° to 10° C.

PROCEDURE: Charge 2300 gms. (2.3 parts) of Example 52 into a 5-liter, 3-neck, round-bottom flask equipped with a dropping funnel, thermometer and mechanical stirrer. Cool the mixture to 25° C with an ice bath or other cooling equipment. Premix 8 gms (0.008 part) of magnesium sulfate in 200 gms. (0.2 part) of deionized water. Add this mixture dropwise over a ten-minute interval while the mixture is being stirred. While the mixture is being maintained between 20° and 25° C with an ice bath, 100 ml. (0.1 part) of 30% hydrogen peroxide is added dropwise over 30 minutes. The mixture is constantly being stirred during this addition. If the temperature should rise above 25° C, the addition of hydrogen peroxide is stopped until the temperature is less than 25° C. Once the addition of hydrogen peroxide is complete the mixture is stirred for one hour while the temperature is maintained between 20° and 25° C. Then the mixture is poured into a 3000 ml. beaker or like container. Then 100 gms. (0.1 part) of sodium sulfate is added and the mixture stirred for 15 minutes. The mixture now becomes very thick and the lignin-epoxy resin can now be easily separated by various means, such as filtering or spray drying.

EXAMPLE 57

This example illustrates the epoxidation of a reactive intermediate prepared from lignin, such as Indulin AT, mesityl oxide and formaldehyde. This epoxidatiion produces a lignin-epoxy resin with about one-fifth as many epoxy groups as Example 54.

PROCEDURE: Charge 2150 gms. (2.15 parts) of Example 53 into a 5-liter, 3-neck, round-bottom flask equipped with a dropping funnel, thermometer and mechanical stirrer. Cool the mixture to 5° to 10° C with an ice bath or other cooling equipment. Premix 3 gms. (0.003 part) of magnesium sulfate in 200 gms. (0.2 part) of deionized water. Add this mixture dropwise over a ten-minute interval while the mixture is being stirred. While the mixture is being maintained between 5° and 10° C, with an ice bath, 17 ml. (0.017 part) of 30% hydrogen peroxide is added dropwise over 30 minutes. The mixture is constantly being stirred during this addition. If the temperature should rise above 10° C, the addition of hydrogen peroxide is stopped until the temperature is less than 10° C. Once the addition of hydrogen peroxide is complete the mixture is stirred for one hour while the temperature is being maintained between 5° and 10° C. Then the mixture is poured into a 3000 ml. beaker or like container. Then 100 gms. (0.1 part) of sodium sulfate is added and the mixture stirred for 15 minutes. The mixture now becomes very thick and the lignin-epoxy resin can now be easily separated by various means, such as filtering or spray drying.

EXAMPLE 58

This example illustrates the reaction of acrylonitrile with Indulin AT lignin to produce an unsaturated amide or intermediate which is chemically bonded to the lignin molecule. This unsaturated intermediate can then be epoxidized by using the procedures of Examples 54 through 57.

PROCEDURE: Dissolve 18 gms. (0.018 part) of sodium hydroxide into 1600 gms. (1.6 parts) of deionized water. Then slowly add 500 gms. (0.5 part) of Indulin AT (a kraft lignin produced by Westvaco Corporation) while the mixture is being agitated. Then charge this premix into a 5-liter, 3-neck round — bottom flask equipped with a thermometer, dropping funnel, and mechanical stirrer. Add 100 gms. (0.10 part) of acrylonitrile dropwise over ten minutes while the mixture is being agitated. Then add 80 gms. (0.08 part) of 40% aqueous formaldehyde dropwise over a ten-minute interval. To this mixture add 8 gms. (0.008 part) of triethylamine.

The dropping funnel is replaced with a water-cooled condenser. The mixture is heated to reflux and refluxed for 30 minutes. The heat is removed and the mixture is stirred while cooling to room temperature. All of the materials appear as a seemingly homogenous liquid. This reaction of the lignin, acrylonitrile and formaldehyde is believed to put unsaturated amide groups onto the lignin molecule. These groups are reactive and may be epoxidized as is disclosed in further examples.

EXAMPLES 59

This example illustrates the reaction of acrolein with Indulin AT lignin to produce an unsaturated carbonyl which is chemically bonded to the lignin molecule. This unsaturated intermediate can then be epoxidized by using the procedures of Examples 54 through 57.

PROCEDURE: Dissolve 18 gms. (0.018 part) of sodium hydroxide into 1600 gms. (1.6 parts) of deionized water. Then slowly add 500 gms. (0.5 part) of Indulin AT (a kraft lignin produced by Westvaco Corporation) while the mixture is being agitated. Then charge this premix into a 5-liter, 3-neck round-bottom flask equipped with a thermometer, dropping funnel, and mechanical stirrer. Add 60 gms. (0.060 part) of acrolein dropwise over ten minutes while the mixture is being agitated. Then add 80 gms. (0.08 part) of 40% aqueous formaldehyde dropwise over a 10-minute interval. To this mixture add 8 gms. (0.008 part) of triethylamine.

The dropping funnel is replaced with a water-cooled condenser. The mixture is heated to relux and refluxed for 30 minutes. The heat is removed and the mixture is stirred while cooling to room temperature. All of the materials appear as a seemingly homogenous liquid. This reaction of the lignin, acrolein and formaldehyde is believed to put unsaturated carbonyl groups onto the lignin molecule. These groups are reactive and may be epoxidized as is disclosed in further examples.

EXAMPLE 60

This example illustrates the reaction of Indulin AT lignin with cyanoacetic acid to produce an unsaturated nitrile which is chemically bonded to the lignin molecule. This unsaturated nitrile can then be epoxidized by using the procedures of Examples 54 through 57.

PROCEDURES: Dissolve 28 gms. (0.028 part) of sodium hydroxide into 1600 gms. (1.6 parts) of deionized water. Then slowly add 500 gms. (0.5 part) of Indulin AT (a kraft lignin produced by Westvaco Corporation) while the mixture is agitated. Then charge this premix into a 5-liter, 3-neck, round-bottom flask equipped with a mechanical stirrer, thermometer, and dropping funnel. Then premix 100 gms. ( 0.10 part) of cyanoacetic acid in 200 gms. (0.2 part) of deionized water. Add this mixture dropwise over a period of one-half hour. Then stir this mixture at room temperature for one hour. Then replace the dropping funnel with a water-cooled condenser, heat to reflux and reflux for one hour. Afterward the reaction is cooled to room temperature.

EXAMPLE 61

This example illustrates the reaction of Indulin AT lingin with ethyl cyanoacetate to produce an unsaturated nitrile which is chemically bonded to the lignin molecule. this unsaturated nitrile can then be epoxidized by using the procedures of Examples 54 through 57.

PROCEDURE: Dissolve 28 gms. (0.028 part) of sodium hydroxide into 1600 gms. (1.6 parts) of deionized water. Then slowly add 500 gms. (0.5 part) of Indulin AT (a kraft lignin produced by Westvaco Corporation) while the mixture is being agitated. Then charge this premix into a 5-liter, 3-neck round-bottom flask equipped with a mechanical stirrer, thermometer, and dropping funnel. Then premix 120 gms. (0.12 part) of ethyl cyanoacetate in 200 gms. (0.2 part) of deionized water. Add this mixture dropwise over a period of one-half hour. Then stir this mixture at room temperature for one hour. Then replace the dropping funnel with a water-cooled condenser, heat to reflux and reflux for one hour. Afterward the reaction is cooled to room temperature.

EXAMPLE 62

This example illustrates the reaction of Indulin AT lignin with methyl cyanoacetate to produce an unsaturated nitrile which is chemically bonded to the lignin molecule. This unsaturated nitrile can then be epoxidized by using procedures of Examples 54 through 57.

PROCEDURE: Dissolve 28 gms. (0.028 part) of sodium hydroxide into 1600 gms. (1.6 parts) of deionized water. Then slowly add 500 gms. (0.5 part) of Indulin AT (a kraft lignin produced by Westvaco Corporation) while the mixture is being agitated. Then charge this premix into a 5-liter, 3-neck round-bottom flask equipped with a mechanical stirrer, thermometer and dropping funnel. Then premix 110 gms. (0.11 part) of methyl cyanoacetate in 200 gms. (0.2 part) of deionized water. Add this mixture dropwise over a period of deionized water. Add this mixture dropwise over a period of one-half hour. Then stir this mixture at room temperature for 1 hour. Then replace the dropping funnel with a water-cooled condenser, heat to reflux and reflux for one hour. Afterwards the reaction is cooled to room temperature.

EXAMPLE 63

This example illustrates the reaction of Indulin AT lignin with dimethylmalonate to produce an unsaturated ester which is chemically bonded to the lignin molecule. This unsaturated ester can then be epoxidized by using the procedures of Examples 54 through 57.

PROCEDURE: Dissolve 20 gms. (0.02 part) of sodium hydroxide into 1600 gms. (1.6 parts) of deionized water. Then slowly add 500 gms. (0.5 part) of Indulin AT (a kraft lignin produced by Westvaco Corporation) while the mixture is agitated. Then charge this premix into a 5-liter, 3-neck, round-bottom flask equipped with a mechanical stirrer, thermometer, and dropping funnel. Then premix 140 gms. (0.14 part) of dimethylmalonate in 200 gms. (0.2 part) of deionized water. Add this mixture dropwise over a period of one-half hour. Then stir this mixture at room temperature for one hour. Then replace the dropping funnel with a water-cooled condenser, heat to reflux and reflux for 1 hour. Afterward the reaction is cooled to room temperature.

EXAMPLE 64

This example illustrates the reaction of Indulin AT lignin with malonic acid to produce an unsaturated acid which is chemically bonded to the lignin molecule. This unsaturated acid can then be epoxidized by using procedures of Examples 54 through 57.

PROCEDURE: Dissolve 28 gms. (0.028 part) of sodium hydroxide into 1600 gms. (1.6 parts) of deionized water. Then slowly add 500 gms. (0.5 part) of Indulin AT (a kraft lignin produced by Westvaco Corporation) while the mixture is being agitated. Then charge this premix into a 5-liter, 3-neck, round-bottom flask equipped with a mechanical stirrer, thermometer and dropping funnel. Then premix 110 gms. (0.11 part) of malonic acid in 200 gms. (0.2 part) of deionized water. Add this mixture dropwise over a period of one-half hour. Then stir this mixture at room temperature for one hour. Then replace the dropping funnel with a water-cooled condenser, heat to reflux and reflux for one hour. Afterward the reaction is cooled to room temperature.

EXAMPLE 65

This example illustrates the reaction of a lignin epoxy resin with a polyazelaic polyanhydride curing agent. This reaction produces a hard, glossy plastic whose properties depend on the ratio of curing agent to lignin-epoxy resin and also how long the material is cured.

PROCEDURE: Melt B in a suitable pyrex beaker and then add A and mix well and heat to 400° F. The mixture reacts to produce a viscous liquid which on continued heating, will produce fibers of any length desired from a bead drawn from the melt.

A = 100 parts of dried epoxidized lignin from Example 54.

B = 35 parts polyazelaic polyanhydride (purchased from Emery Industries).

EXAMPLE 66

This example illustrates the epoxidation of an Indulin AT unsaturated carbonyl with sodium peroxide.

PROCEDURE: Charge 2300 gms. (2.3 parts) of Example 52 into a 5-liter, 3-neck, round-bottom flask equipped with a dropping funnel, thermometer and mechanical stirrer. Cool the mixture to 5° to 10° C with an ice bath or other cooling equipment.

Premix 8 gms. (0.008 part) of magnesium sulfate in 200 gms. (0.2 part) of deionized water. Add this mixture dropwise over a 10-minute interval while the mixture is being stirred. While the mixture is being maintained between 5° and 10° C with an ice bath, 80 gms. (0.08 part) of sodium peroxide dissolved in 200 ml. (0.2 part) of deionized water is added dropwise over 30 minutes. The mixture is constantly being stirred during this addition. If the temperature should rise above 10° C, the addition of sodium peroxide is stopped until the temperature is less than 10° C. Once the addition of sodium peroxide is complete the mixture is stirred for one hour while the temperature is being maintained between 5° and 10° C. Then the mixture is poured into a 3000 ml. beaker or like container. Then 100 gms. (0.1 part) of sodium sulfate is added and the mixture stirred for 15 minutes. The mixture now becomes very thick and the lignin-epoxy resin can now be easily separated by various means, such as filtering or spray drying.

EXAMPLE 67

This example illustrates the epoxidation of an Indulin AT unsaturated carbonyl with sodium peroxide to produce an epoxy-lignin resin which has one-fifth as many epoxy groups as Example 66.

PROCEDURE: Charge 2150 gms. (2.15 parts) of Example 53 into a 5-liter, 3-neck, round-bottom flask equipped with a dropping funnel, thermometer and mechanical stirrer. Cool the mixture to 5° to 10° C with an ice bath or other cooling equipment.

Premix 3 gms. (0.003 part) of magnesium sulfate in 200 gms. (0.2 part) of deionized water. Add this mixture dropwise over a ten-minute interval while the mixture is being stirred. While the mixture is being maintained between 5° and 10° C. with an ice bath, 16 gms. (0.016 part) of sodium peroxide dissolved in 200 ml. (0.20 part) of deionized water is added dropwise over 30 minutes. The mixture is constantly stirred during this addition. If the temperature should rise about 10° C, the addition of sodium peroxide is stopped until the temperature is less than 10° C. Once the addition of sodium peroxide is complete the mixture is stirred for one hour while the temperature is being maintained between 5° and 10° C.

Then the mixture is poured into a 3000 ml. beaker or line container. Then 100 gms. (0.1 part) of sodium sulfate is added and the mixture stirred for 15 minutes. The mixture now becomes very thick and the lignin-epoxy resin can now be easily separated by various means, such as filtering or spray drying.

EXAMPLE 68

This example illustrates the separation of lignin from kraft black liquor by using decyl alcohol, an organic alcohol, which is a material which is considered only a partial solvent for lignin.

PROCEDURE: Charge 400 ml. (4 parts) of kraft black liquor (50% solids) into a one liter vessel. Add 100 ml. (1 part) of water and stir. Then add 100 ml. (1 part) of decyl alcohol. While this mixture is being stirred, add 25 ml. (0.25 parts) of 80% acetic acid slowly over a five minute interval. As soon as the viscosity of the mixture starts to increase the stirring may be discontinued and a layer starts to form which contains the lignin.

EXAMPLE 69

This example illustrates the separation of lignin from kraft black liquor by using iso-octyl alcohol, an aliphatic alcohol, a partial solvent for lignin.

PROCEDURE: Charge 400 ml. (4 parts) of kraft black liquor (50% solids) into a one liter vessel. Add 100 ml. (1 part) of water and stir. Then add 100 ml. (1 part) of iso-octyl alcohol. While this mixture is being stirred, add 26 ml. (0.25 parts) of 80% acetic acid slowly over a five minute interval. As soon as the viscosity of the mixture starts to increase the stirring may be discontinued and a layer starts to form which contains the lignin.

EXAMPLE 70

This example illustrates the separation of lignin from kraft black liquor by using methyl amyl ketone, an organic ketone, a partial solvent for lignin.

PROCEDURE: Charge 400 ml. (4 parts) of kraft black liquor (50%) solids) into one liter vessel. Add 100 ml. (1 part) of water and stir. Then add 100 ml. (1 part) of methyl amyl ketone. While this mixture is being stirred, add 25 ml. (0.25 parts) of 80% acetic acid slowly over a five minute interval. As soon as the viscosity of the mixture starts to increase the stirring may be discontinued and a layer starts to form.

EXAMPLE 71

This example illustrates the separation of lignin from kraft black liquor by using Pluracol TP-740, a product of BASF WYANDOTTE, a liquid polyoxypropylene derivative of trimethylolpropane. This material is normally considered to be only a partial solvent for lignin. This example also illustrates a very large market for lignin by combining lignin with various polyether polyols to produce various polyurethane products.

PROCEDURE: Charge 400 ml. (4 parts) of kraft black liquor (50% solids) into a one liter vessel. Add 100 ml. (1 part) of water and stir. Then add 100 ml. (1 part) of Pluracol TP-740. While this mixture is being stirred, add 25 ml. (0.25 parts) of 80% acetic acid slowly over a five minute interval. As soon as the viscosity of the mixture starts to increase the stirring may be discontinued and a layer starts to form which contains the lignin.

EXAMPLE 72

This example illustrates the separation of lignin from kraft black liquor by using dicyclopentadiene alcohol. This material is normally considered to be only a partial solvent for lignin.

PROCEDURE: Charge 400 ml. (4 parts ) of kraft black liquor (50% solids) into a one liter vessel. Add 100 ml. (1 part) of water and stir. Then add 100 ml. (1 part) of dicyclopentadiene alcohol. While this mixture is being stirred, add 25 ml. (0.25 parts) of 80% acetic acid slowly over a five minute interval. As soon as the viscosity of the mixture starts to increase the stirring may be discontinued and a layer starts to form which contains the lignin.

EXAMPLE 73

This example illustrates the separation of lignin from kraft black liquor by using 2-heptanone, an organic ketone. This material is normally considered to be only a partial solvent for lignin.

PROCEDURE: Charge 400 ml. (4 parts) of kraft black liquor (50% solids) into a one liter vessel. Add 100 ml. (1 part) of water and stir. Then add 100 ml. (1 part) of 2-heptanone. While this mixture is being stirred, add 25 ml. (0.25 parts) of 80% acetic acid slowly over a five minute interval. As soon as the viscosity of the mixture starts to increase the stirring may be discontinued and a layer starts to form which contains the lignin.

EXAMPLE 74

This example illustrates the separation of lignin from kraft liquor by using dimethyl-4-heptanone, an organic ketone. This material is normally considered to be only a partial solvent for lignin.

PROCEDURE: Charge 400 ml. (4 parts) of kraft black liquor (50% solids) into a one liter vessel. Add 100 ml. (1 part) of water and stir. Then add 100 ml. (1 part) of dimethyl-4-heptanone. While this mixture is being stirred, add 25 ml. (0.25 parts) of 80% acetic acid slowly over a five minute interval. As soon as the viscosity of the mixture starts to increase the stirring may be discontinued and a layer starts to form which contains the lignin.

EXAMPLE 75

This example illustrates the separation of lignin from kraft black liquor by using xylene solvent which consists of a mixture of ortho and para xylene as well as some ethyl benzene. This material is normally considered to be a non-solvent for lignin.

PROCEDURE: Charge 400 ml. (4 parts) of kraft black liquor (50% solids) into a one liter vessel. Add 100 ml. (1 part) of water and stir. Then add 100 ml. (1 part) of xylene. While this mixture is being stirred, add 25 ml. (0.25 parts) of 80% acetic acid slowly over a five minute interval. As soon as the viscosity of the mixture starts to increase the stirring may be discontinued and a layer starts to form which contains the lignin.

EXAMPLE 76

This example illustrates the separation of lignin from kraft black liquor by using ethyl benzene, an aromatic hydrocarbon. This material is normally considered to be a non-solvent for lignin.

PROCEDURE: Charge 400 ml. (4 parts) of kraft black liquor (50% solids) into a one liter vessel. Add 100 ml. (1 part) of water and stir. Then add 100 ml. (1 part) of ethyl benzene. While this mixture is being stirred, add 25 ml. (0.25 parts) of 80% acetic acid slowly over a five minute interval. As soon as the viscosity of the mixture starts to increase the stirring may be discontinued and a layer starts to form which contains the lignin.

EXAMPLE 77

This example illustrates the separation of lignin from kraft black liquor by using monochlorobenzene, an aromatic chlorohydrocarbon. This material is normally considered to be a non-solvent for lignin.

PROCEDURE: Charge 400 ml. (4 parts) of kraft black liquor (50% solids) into a one liter vessel. Add 100 ml. (1 part) of water and stir. Then add 100 ml. (1 part) of monochlorobenzene. While this mixture is being stirred, add 25 ml. (0.25 parts) of 80% acetic acid slowly over a five minute interval. As soon as the viscosity of the mixture starts to increase the stirring may be discontinued and a layer starts to form which contains the lignin.

EXAMPLE 78

This example illustrates the separation of lignin from kraft black liquor by using a number one fuel oil, which is an aliphatic hydrocarbon. This material is normally considered to be a non-solvent for lignin.

PROCEDURE: Charge 400 ml. (4 parts) of kraft black liquor (50% solids) into a one liter vessel. Add 100 ml. (1 part) of water and stir. Then add 100 ml. (1 part) of number one fuel oil. While this mixture is being stirred, add 25 ml. (0.25 parts) of 80% acetic acid slowly over a five minute interval. As soon as the viscosity of the mixture starts to increase the stirring may be discontinued and a layer starts to form which contains the lignin.

EXAMPLE 79

This example illustrates the separation of lignin from kraft black liquor by using Freon TF, a duPont product, which is a fluorocarbon. This material is normally considered to be a non-solvent for lignin. The use of fluorocarbons have several advantages, the first is that they have low boiling points which requires less energy to spray-dry and they can easily be recovered and used again. These types of materials also are non-flammable and relatively non-toxic.

PROCEDURE: Charge 400 ml. (4 parts) of kraft black liquor (50% solids) into a one liter vessel. Add 100 ml. (1 part) of water and stir. Then add 100 ml. (1 part) of Freon TF, a fluorocarbon. While this mixture is being stirred, add 25 ml. (0.25 parts) of 80% acetic acid slowly over a five minute interval. As soon as the viscosity of the mixture starts to increase the stirring may be discontinued and a layer starts to form which contains the lignin.

EXAMPLE 80

This example illustrates the separation of lignin from sulfite waste liquor by using a solvent such as methyl amyl ketone, an organic ketone.

PROCEDURE: Charge 320 ml. (3.2 parts) of sulfite waste liquor into a one liter vessel. Add 220 ml. (2.2 parts) of water and stir. Then add 200 ml. (2.0 parts) of methyl amyl ketone. While this mixture is being stirred, add 50 ml. (0.5 parts) of concentrated sulfuric acid slowly over a five minute interval. Once the addition of the sulfuric acid is complete, the stirring may be continued for another fifteen minutes and then stopped. The length of time which is required at this point for stirring is dependent on the amounts of material involved in the separation. Once the stirring is discontinued, a layer starts to form which contains the lignin.

EXAMPLE 81

This example illustrates the separation of lignin from sulfite waste liquor by using a solvent such as benzaldehyde, an aromatic aldehyde.

PROCEDURE: Charge 320 ml. (3.2 parts) of sulfite waste liquor into a one liter vessel. Add 220 ml. (2.2 parts) of water and stir. Then add 200 ml. (2.0 parts) of benzaldehyde. While this mixture is being stirred, add 50 ml. (0.5 parts) of concentrated sulfuric acid slowly over a five minute interval. Once the addition of the sulfuric acid is complete, the stirring may be continued for another 15 minutes and then stopped. The length of time which is required at this point for stirring is dependent on the amounts of material involved in the separation. Once the stirring is discontinued, a layer starts to form which contains the lignin.

EXAMPLE 82

This example illustrates the separation of lignin from sulfite waste liquor by using mesityl oxide, an organic ketone. This material is normally considered to be only a partial solvent for lignin.

PROCEDURE: Charge 320 ml. (3.2 parts) of sulfite waste liquor into a one liter vessel. Add 220 ml. (2.2 parts) of water and stir. Then add 200 ml. (2.0 parts) of mesityl oxide. While this mixture is being stirred, add 50 ml. (0.5 parts) of concentrated sulfuric acid slowly over a 5 minute interval. Once the addition of the sulfuric acid is complete, the stirring may be continued for another fifteen minutes and then stopped. The length of time which is required at this point for stirring is dependent on the amounts of material involved in the separation. Once the stirring is discontinued, a layer starts to form which contains the lignin.

EXAMPLE 83

This example illustrates the separation of lignin from sulfite waste liquor by using butyraldehyde, an organic aldehyde. This material is normally considered to be only a partial solvent for lignin.

PROCEDURE: Charge 320 ml. (3.2 parts) of sulfite waste liquor into a one liter vessel. Add 220 ml. (2.2 parts) of water and stir. Then add 200 ml. (2.0 parts) of butyraldehyde. While this mixture is being stirred, add 50 ml. (0.5 parts) of concentrated sulfuric acid slowly over a 5 minute interval. Once the addition of the sulfuric acid is complete, the stirring may be continued for another 15 minutes and then stopped. The length of time which is required at this point for stirring is dependent on the amounts of material involved in the separation. Once the stirring is discontinued, a layer starts to form which contains the lignin.

EXAMPLE 84

This example illustrates the separation of lignin from sulfite waste liquor by using a xylene solvent which consists of a mixture of ortho and para xylene as well as some ethyl benzene, which represent aromatic hydrocarbons. This material is normally considered to be a non-solvent for lignin.

PROCEDURE: Charge 320 ml. (3.2 parts) of sulfite waste liquor into a one liter vessel. Add 220 ml. (2.2 parts) of water and stir. Then add 200 ml. (2.0 parts) of a xylene solvent which consists of a mixture of ortho and para xylene as well as some ethyl benzene. While this mixture is being stirred, add 50 ml. (0.5 parts) of concentrated sulfuric acid slowly over a five minute interval. Once the addition of the sulfuric acid is complete, the stirring may be continued for another fifteen minutes and then stopped. The length of time which is required at this point for stirring is dependent on the amounts of material involved in the separation. Once the stirring is discontinued, a layer starts to form which contains the lignin.

EXAMPLE 85

This example illustrates the separation of lignin from sulfite waste liquor by using a Freon TF, a duPont product which is a fluorocarbon. This material is normally considered to be a non-solvent for lignin.

PROCEDURE: Charge 320 ml. (3.2 parts) of sulfite waste liquor into a one liter vessel. Add 220 ml. (2.2 parts) of water and stir. Then add 200 ml. (2.0 parts) of Freon TF, a fluorocarbon. While this mixture is being stirred, add 50 ml. (0.5 parts) of concentrated sulfuric acid slowly over a five minute interval. Once the addition of the sulfuric acid is complete, the stirring may be continued for another fifteen minutes and then stopped. The length of time which is required at this point for stirring is dependent on the amounts of material involved in the separation. Once the stirring is discontinued, a layer starts to form which contains the lignin.

CONCLUSION

It will be apparent from the above that a new and unique process has been disclosed for separating lignin from waste black cooking liquor resulting from the kraft and sulfite paper pulping process and the producing an epoxide-lignin resin from the so separated lignin. This resin is then susceptible of many uses including adhesives, paints and cast and hardened resinous or plastic products. This process therefore provides new use for lignin which has been previously used primarily only for its heat value by burning. It will be clear from the present disclosure that lignin resulting from paper pulping processes in general may be utilized for the disclosed purposes and it need not have been separated solely by the process first disclosed herein. The lignin separated from the black liquors is also susceptible of many commercial uses.

Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be resorted to without departing from the spirit and the scope of the invention as hereinafter claimed.

What is claimed is:

1. The method of separating lignin from aqueous waste black liquor, comprising the steps of contacting the waste black liquor with an organic chemical solvent in which the lignin is at least partially soluble and adding acid to the mixture to lower the pH to thereby separate a layer which layer contains lignin in said organic chemical solvent separate from an aqueous layer.

2. The method claimed in claim 1 wherein the waste black liquor is from the kraft pulping process.

3. The method claimed in claim 1 wherein the waste black liquor is from the sulfite pulping process.

4. The method of claim 1, wherein the pH is lowered to below 7.0.

5. The method of claim 1, wherein the pH is lowered to a value above 7.0.

6. The method of claim 1, wherein said organic chemical solvent is a ketone, an ester, an aldehyde, an ether, an alcohol or a chlorinated hydrocarbon.

7. The method of claim 6, wherein said ketone is mesityl oxide, cyclohexanone, isophorone, methyl heptyl ketone, methyl amyl ketone, 2-heptanone or dimethyl-4-heptanone.

8. The method of claim 6, wherein said ester is 2, 2, butoxy ethoxy ethyl acetate, hexylacetate, heptyl acetate, amylacetate, is-amyl acetate or phenyl acetate.

9. The method of claim 6, wherein said aldehyde is benzaldehyde, valeraldehyde, butyraldehyde or furfural.

10. The method of claim 6, wherein said alcohol is decyl alcohol, iso-octyl alcohol or dicyclopentadiene alcohol.

11. The method of claim 6, wherein said chlorinated hydrocarbon is methylene chloride.

12. The method of claim 6, wherein said ether is butyl ether, 2, 2, butoxy ethoxy ethyl acetate or polyoxypropylene.

13. The method of claim 6, wherein the ketone, ester, ether, aldehyde, alcohol or chlorinated hydrocarbon is extended by the addition of xylene, toluene, ethylbenzene or benzene.

14. The method of claim 6, wherein the ketone, ester, ether, aldehyde, alcohol or chlorinated hydrocarbon is added to the waster black liquor with agitation and the mixture is acidified by adding acetic acid.

15. The method of claim 6, wherein the ketone, ester, ether, aldehyde, alcohol or chlorinated hydrocarbon is added to the waste black liquor with agitation and the mixture is acidified by adding sulfuric acid.

16. The method of claim 6, wherein the ketone, ester, ether, aldehyde, alcohol or chlorinated hydrocarbon is added to the waste black liquor with agitation and the mixture is acidified by adding carbon dioxide.

17. The method of claim 6, wherein magnesium sulfate is added to the mixture to improve the separation.

18. The method of separating lignin from aqueous waste black liquor, comprising the steps of contacting the waste black liquor with an organic chemical material in which the lignin is not normally considered to be soluble to wet the lignin particles with the organic chemical material and adding acid to the mixture to lower the pH to thereby separate a layer which layer contains lignin in said organic chemical material separate from an aqueous layer.

19. The method of claim 18, wherein said organic chemical material is an aromatic hydrocarbon, an aliphatic hydrocarbon or a fluorocarbon.

* * * * *